United States Patent [19]
Liao

[11] Patent Number: 5,878,879
[45] Date of Patent: Mar. 9, 1999

[54] CASSETTE HOLDER HAVING EASILY REMOVABLE INSERT

[76] Inventor: Chung Kuang Liao, No. 833, Yong Tsuen East 1st Road, Taichung, Taiwan

[21] Appl. No.: 40,202

[22] Filed: Mar. 13, 1998

[51] Int. Cl.[6] .................................................. B65D 85/57
[52] U.S. Cl. ...................... 206/308.1; 206/232; 206/493; 312/9.16
[58] Field of Search ................................ 206/232, 308.1, 206/309–313, 387.12, 1.5, 307, 493, 303; 312/9.11, 9.16, 9.17, 9.47, 9.48

[56] References Cited

U.S. PATENT DOCUMENTS

| | | | |
|---|---|---|---|
| 4,899,875 | 2/1990 | Herr et al. ............................. | 206/308.1 |
| 5,334,904 | 8/1994 | Kramer ................................ | 206/308.1 |
| 5,363,960 | 11/1994 | Ackeret ............................... | 206/387.12 |
| 5,549,199 | 8/1996 | Lindsay ................................ | 206/308.1 |
| 5,706,943 | 1/1998 | Yu ........................................ | 206/306.1 |
| 5,713,464 | 2/1998 | Chang . | |
| 5,746,314 | 5/1998 | Knutsen et al. ........................ | 206/309 |

*Primary Examiner*—Paul T. Sewell
*Assistant Examiner*—Luan K. Bui

[57] ABSTRACT

A cassette holder includes a housing having a front flange and an insert slidably engaged in the housing for receiving a disc. A knob is pivotally coupled to the insert and has a latch for engaging with the flange and for securing the insert in the housing. A spring device may bias the latch to engage with the flange and another spring device is engaged with the insert and the housing for biasing the insert outward of the housing when the knob is depressed to disengage the latch from the flange.

6 Claims, 8 Drawing Sheets

CASSETTE HOLDER HAVING EASILY REMOVABLE INSERT

BACKGROUND OF THE INVENTION

1. Field of the Invention

The present invention relates to a cassette holder, and more particularly to a cassette holder having an easily removable insert for allowing the cassette to be easily removed.

2. Description of the Prior Art

Typical cassette holders are provided for receiving cassettes. When a number of cassette holders are stacked or superposed with each other, the cassette received in a middle one of the cassette holders may not be easily removed from the cassette holder.

The present invention has arisen to mitigate and/or obviate the afore-described disadvantages of the conventional cassette holders.

SUMMARY OF THE INVENTION

The primary objective of the present invention is to provide a cassette holder having an easily removable insert for allowing the cassette to be easily removed.

In accordance with one aspect of the invention, there is provided a cassette holder comprising a housing including a front portion having an opening and a flange, an insert slidably engaged in the housing for receiving a disc, the insert including a front portion, a knob pivotally coupled to the front portion of the insert at a pivot shaft and including a latch for engaging with the flange of the housing and for securing the insert in the housing, means for biasing the latch to engage with the flange, and means for biasing the insert outward of the housing. The insert biasing means may bias the insert outward of the housing when the knob is depressed to disengage the latch from the flange against the latch biasing means.

The insert includes a rib extended downward, the insert biasing means includes a resilient ring engaged around the rib of the insert and the flange for biasing the insert outward of the housing. The knob includes a slit for engaging with an advertising sheet.

The housing includes a base having two channels and having a stop extended in the channels and includes a cover having two protrusions slidably engaged in the channels of the base, the protrusions are engaged with the stop for securing the cover to the base and each includes two ends having a tapered surface for allowing the protrusions to be moved over the stop.

The cover includes a pair of ears provided in the front portion, the insert includes a pair of guides for engaging with the ears and for preventing the insert from being disengaged from the cover.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Referring to the drawings, and initially to FIGS. 1–5, a cassette holder in accordance with the present invention comprises a housing 20 and an insert 50 slidably engaged into the housing 20 via an opening formed in the front portion of the housing 20 for receiving a disc or a cassette 70 and the like. The housing 20 includes a base 30 having a pair of channels 31 and having one or two stops 32 extended within the channels 31. A cover 40 includes two or more protrusions 41 slidably engaged in the channels 31 for allowing the cover 40 to be slided relative to the base 30. The protrusions 41 may engage with the stops 32 for securing the cover 40 in place to the base 30. The protrusions 41 each includes two tapered ends 42 for allowing the protrusions 41 to be moved pass the stops 32 when the cover 40 is forced to move relative to the base 30 by a great force, and for allowing the cover 40 to be disengaged from the base 30. The cover 40 includes two side walls 44 each having a bottom edge 45 and includes a flange 43 provided in the front portion and having two ends secured to the side walls 44 at ears 46.

Figure 9:
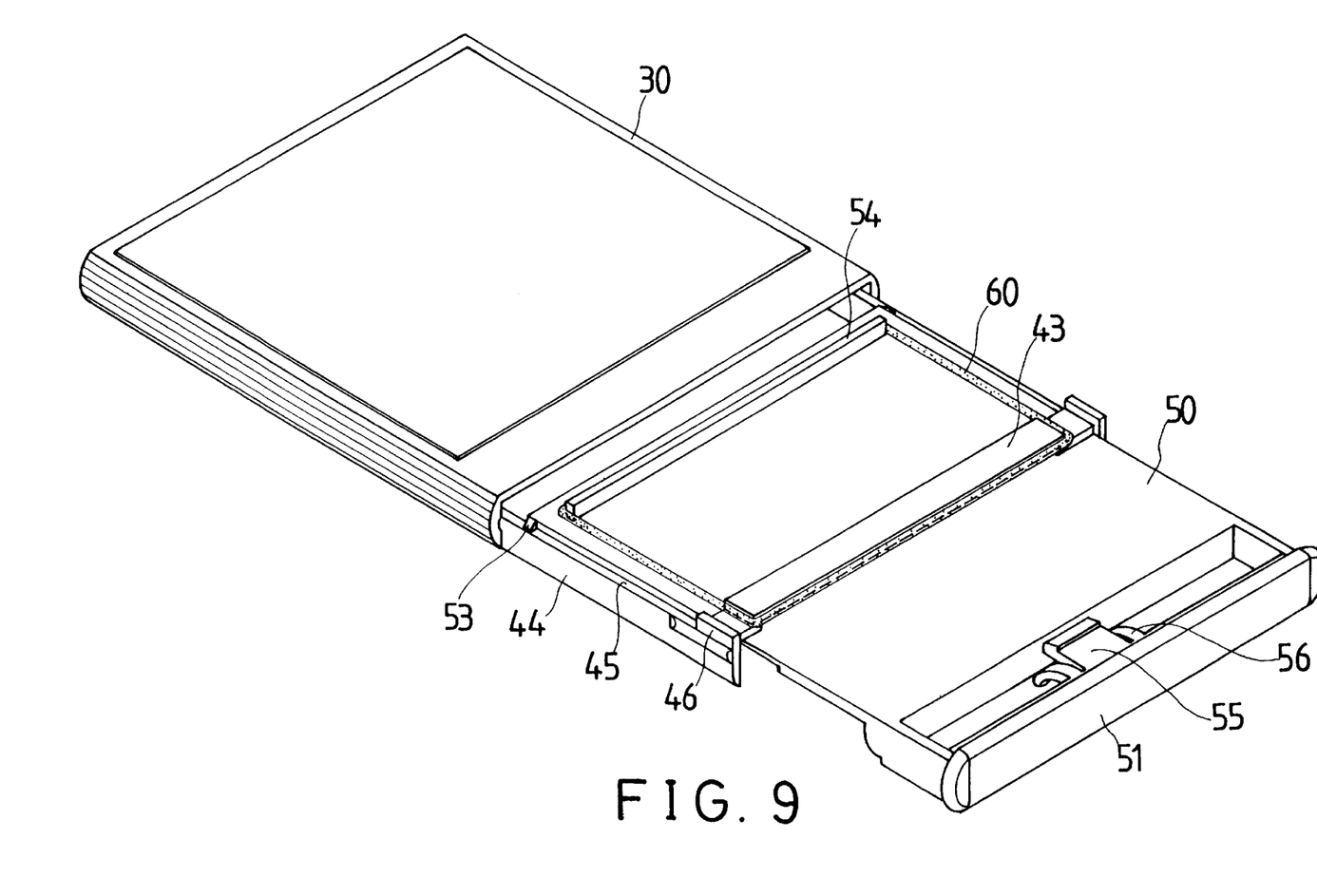
FIG. 9 is a bottom perspective view of the cassette holder in which the cover is slided relative to the base.

The insert 50 includes a rib 54 extended downward from the rear portion and includes one or two guides 53 provided in the rear portion for slidably engaging with the bottom edges 45 of the side walls 44 (FIG. 6) and for allowing the insert 50 to be smoothly moved inward and outward of the housing 20. The guides 53 may engage with the ears 46 of the housing 20 for preventing the insert 50 from being disengaged from the housing 20. As best shown in FIG. 9, an endless and resilient ring 60 is engaged around the rib 54 and the flange 43 for biasing the insert 50 outward of the housing 20. The cover 40 is partially moved outward of the base 30 for illustrating the engagement of the resilient ring 60 with the rib 54 and the flange 43. An advertising sheet 33 (FIG. 1) may be engaged between the base 30 and the insert 50. A knob 51 is pivotally secured to the front portion of the insert 50 at a pivot shaft 515 and includes a slit 511 for engaging with a tag or another advertising sheet 52. The knob 51 includes a latch 55 for engaging with the flange 43 (FIGS. 5, 7) and includes one or more spring members 56 for engaging with the insert 50 and for biasing the latch 55 to engage with the flange 43. The disc 70 and a further advertising sheet 71 (FIG. 1) may be disposed in the insert 50 and between the insert 50 and the cover 40.

Figure 1:
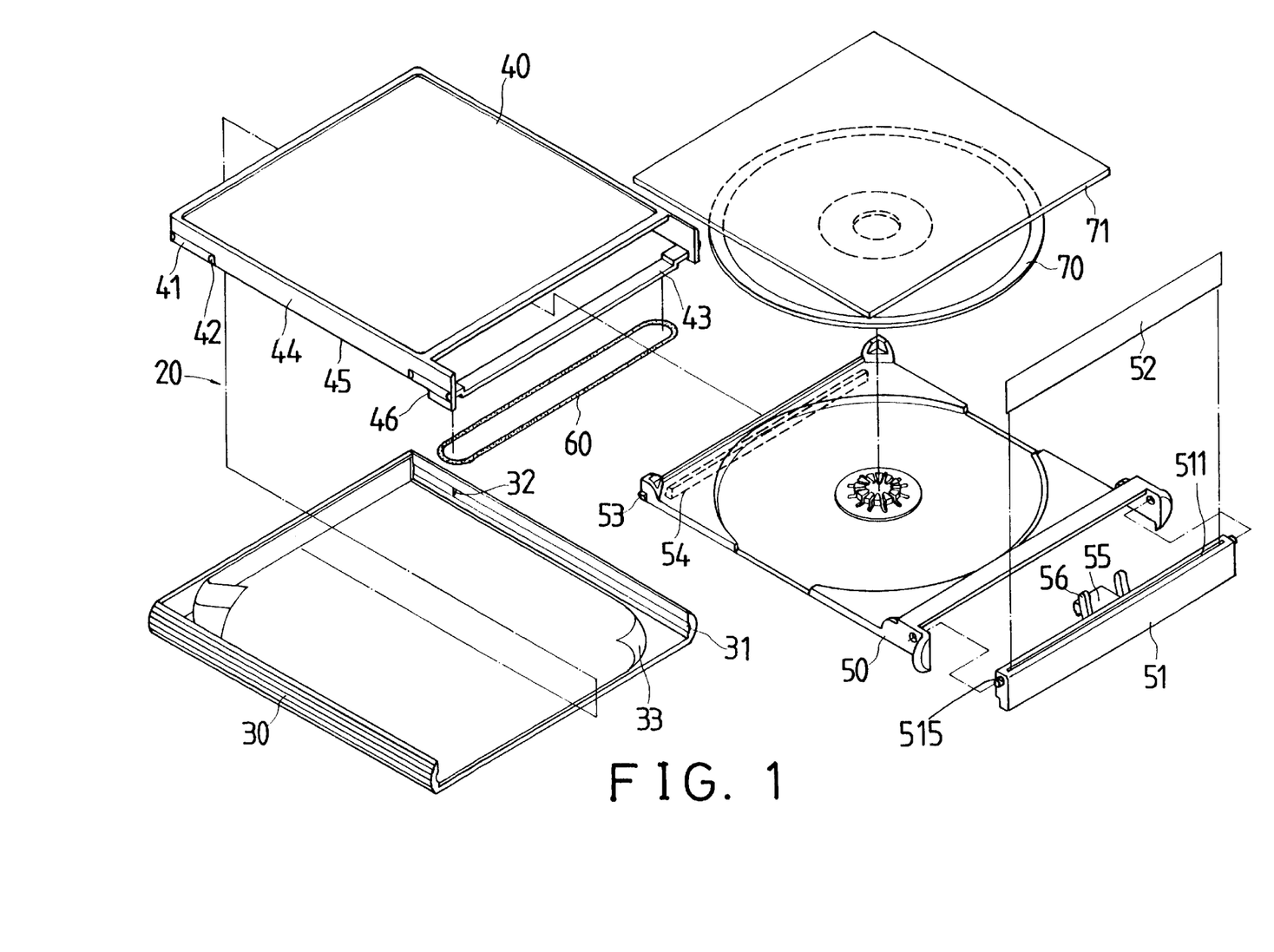
FIG. 1 is an exploded view of a cassette holder in accordance with the present invention.
Figure 2:
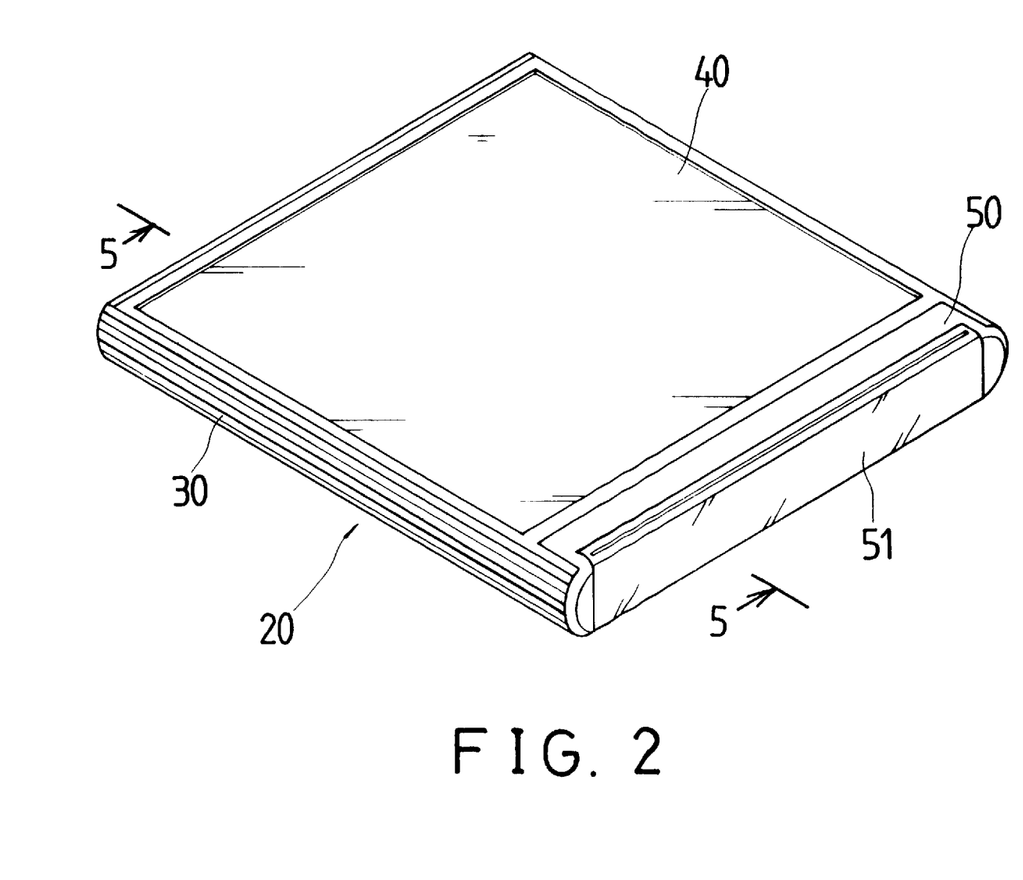
FIG. 2 is a perspective view of the cassette holder in which the insert is engaged in the housing.
Figure 3:
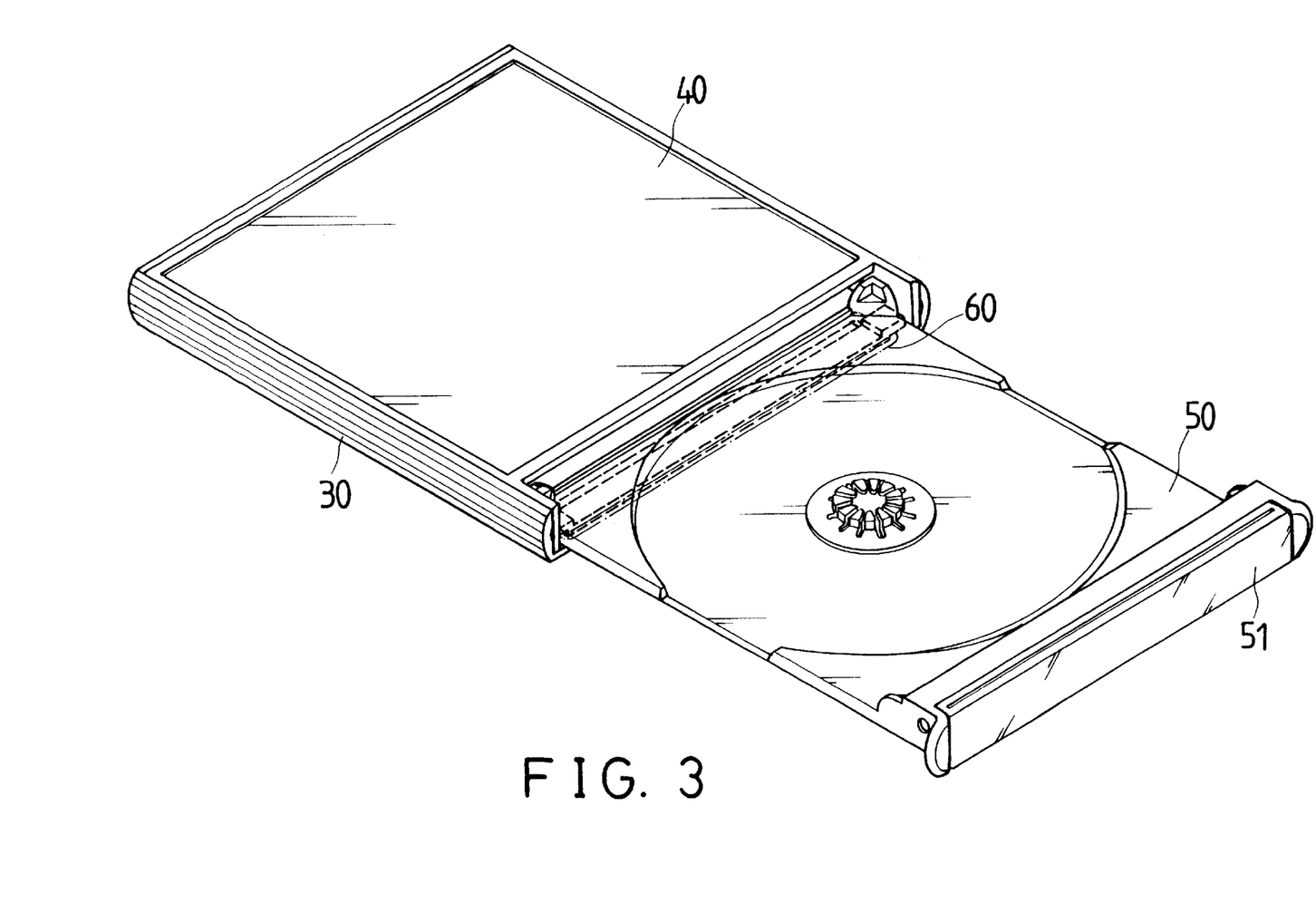
FIG. 3 is a perspective view of the cassette holder in which the insert is extended outward of the housing.
Figure 4:
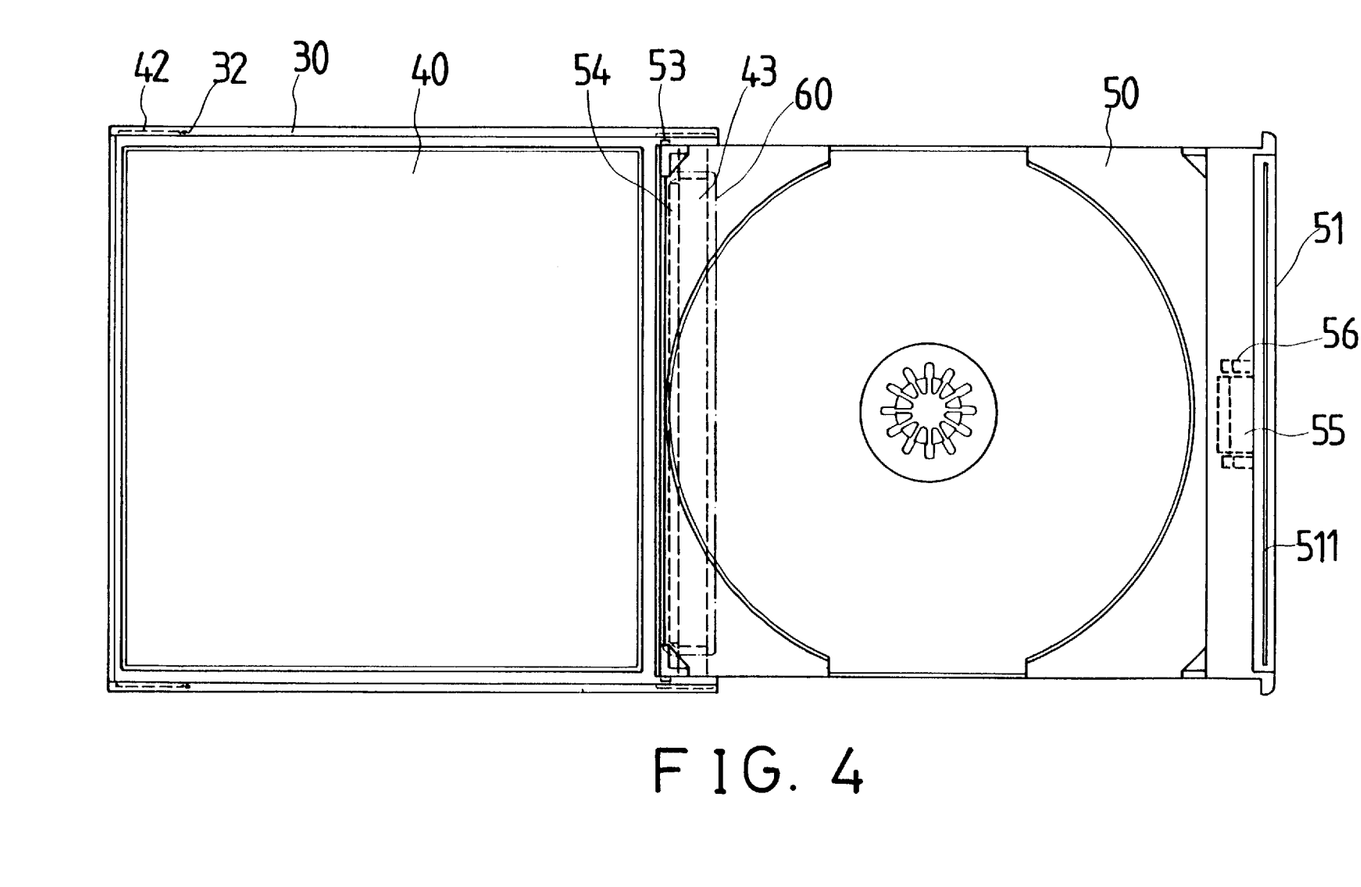
FIG. 4 is a top view of the cassette holder.
Figure 5:
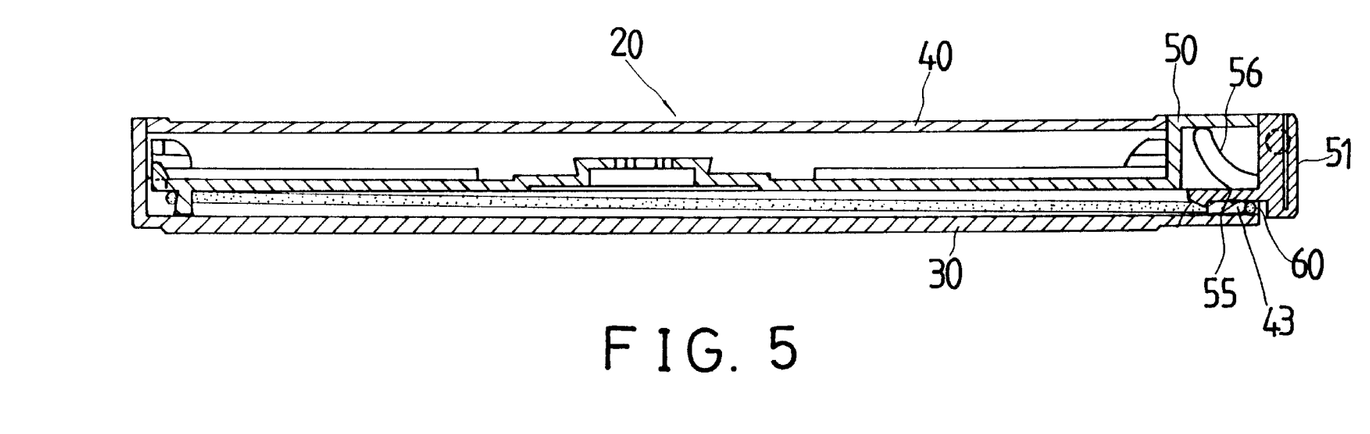
FIG. 5 is a cross sectional view taken along lines 5—5 of FIG. 2.
Figure 6:
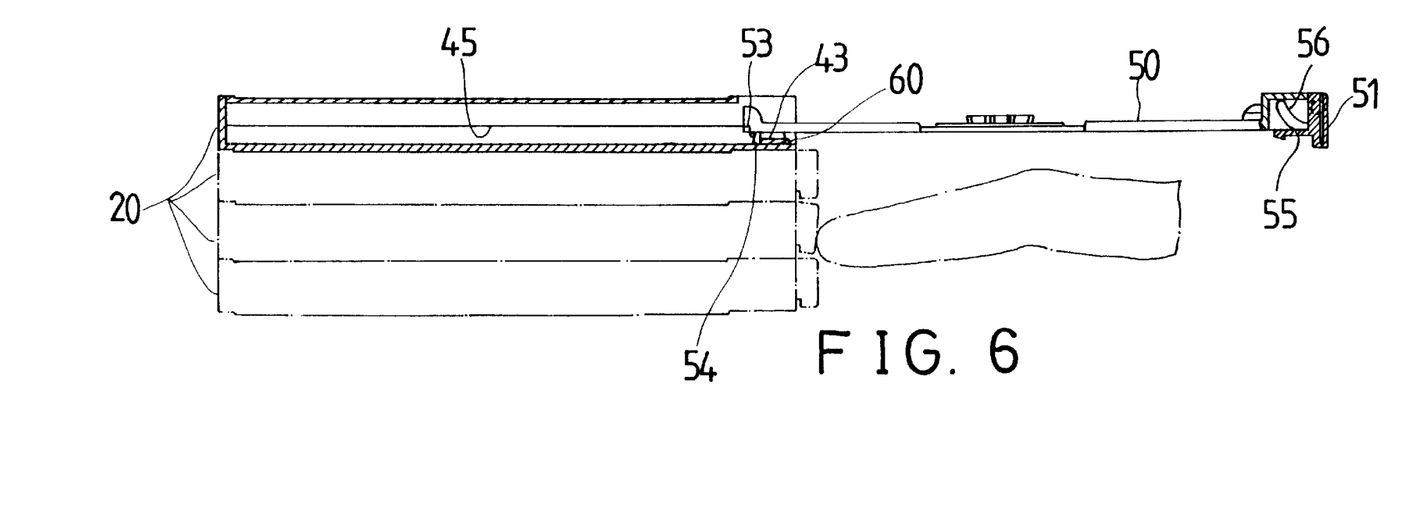
FIG. 6 is a cross sectional view illustrating the operation of the cassette holder.
Figure 7:
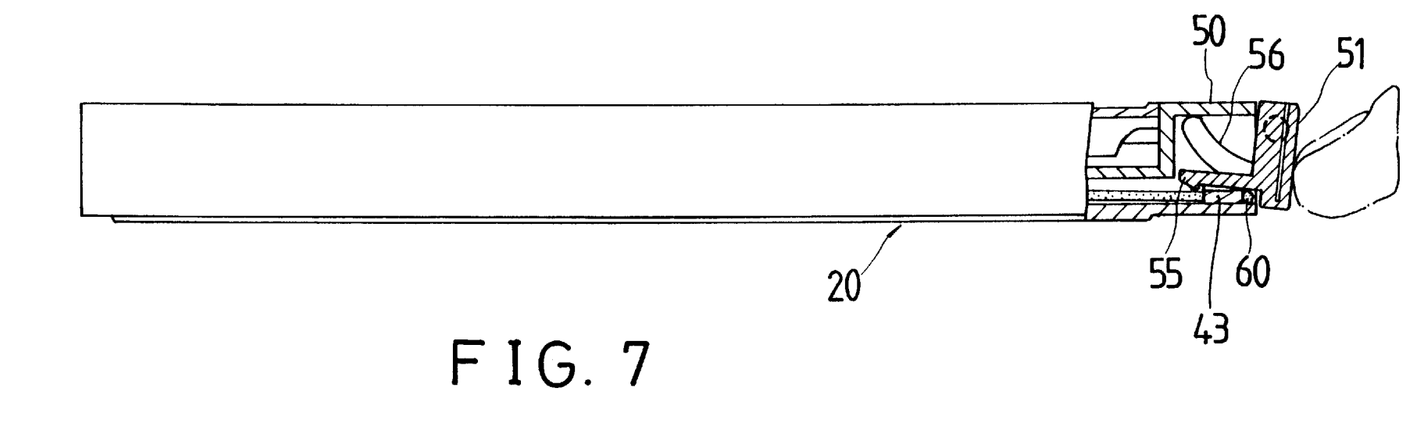
FIG. 7 is a partial cross sectional view of the cassette holder.

In operation, as shown in FIG. 5, the latch 55 may be forced to engage with the flange 43 for securing the insert 50 in the housing 20 when the insert 50 is engaged into the housing 20. As shown in FIG. 7, when the knob 51 is depressed against the spring member(s) 56 by the user, the latch 55 may be disengaged from the flange 43 and the insert 50 may be biased outward of the housing 20 by the resilient ring 60 (FIG. 6). As shown in FIG. 6, when a number of cassette holders 20 are stacked with each other, the insert 50 of a middle one of the cassette holders 20 may also be easily biased outward of the housing 20 when the knob 51 is depressed by the user.

Figure 8:
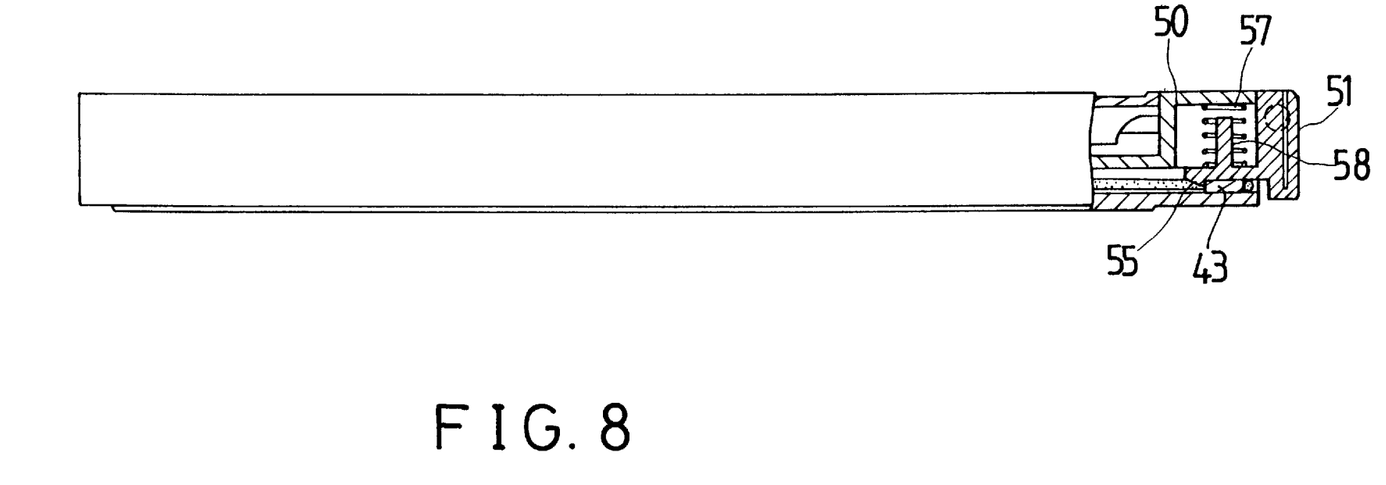
FIG. 8 is a partial cross sectional view similar to FIG. 7, illustrating another application of the cassette holder.
Figure 10:
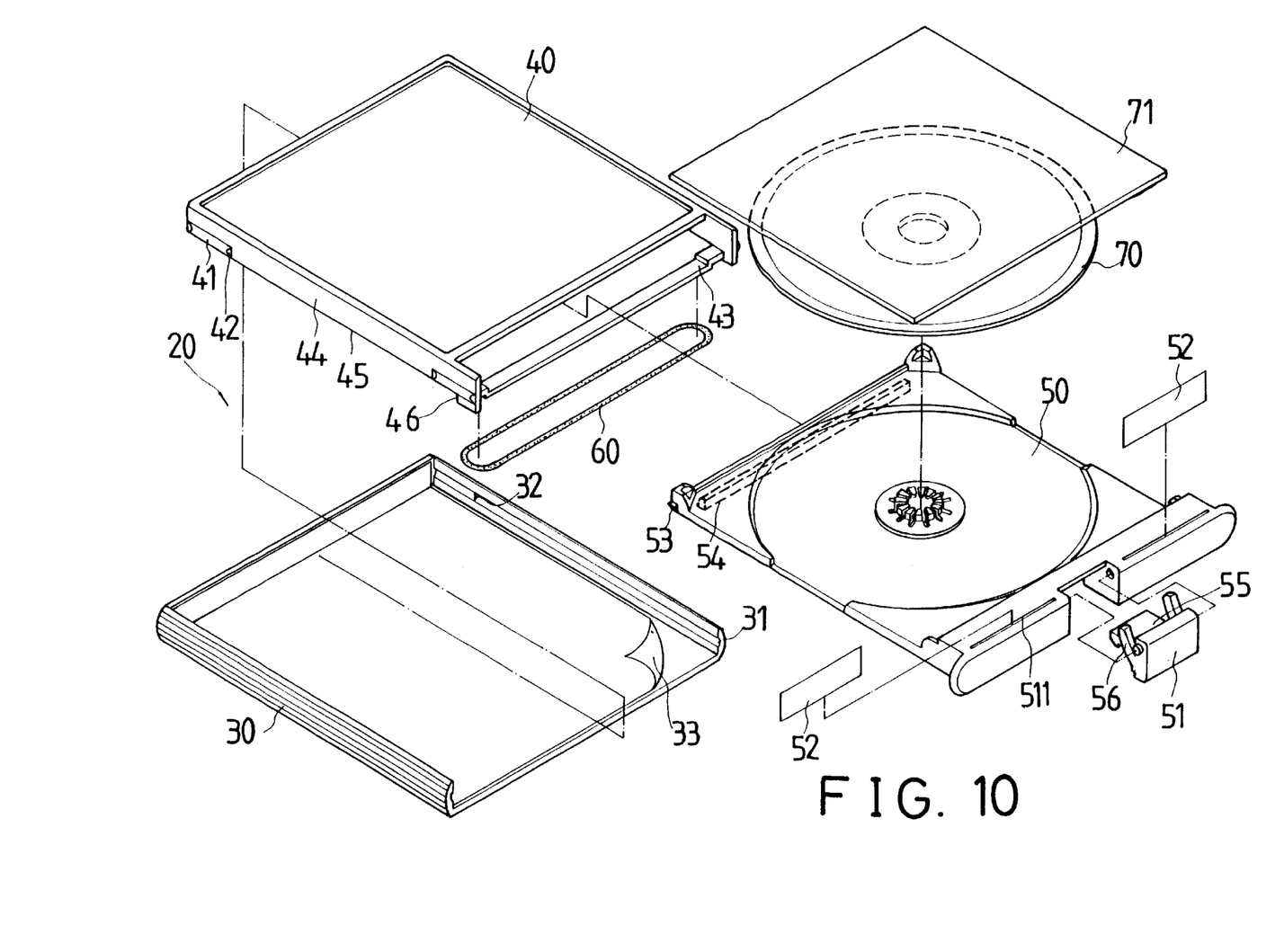
FIG. 10 is an exploded view illustrating a further application of the cassette holder.

Referring next. to FIG. 8, one or more coil springs 57 may be provided and engaged with the pins 58 extended from the latch 55 for biasing the latch 55 to engage with the flange 43. As shown in FIG. 9, the cover 40 may be slided and disengaged from the base 30 for changing the resilient ring 60. As shown in FIG. 10, the knob 51 may include a smaller size and the slit 511 includes two sections for receiving two separate tags or advertising sheets 52. The knob 51 and the base 30 and the cover 40 are made of transparent materials for allowing the advertising sheets 33, 52, 71 to be seen through the knob and the base and the cover.

Accordingly, the cassette holder in accordance with the present invention includes an easily removable insert for allowing the cassette to be easily removed.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cassette holder comprising:

a housing including a front portion having an opening and a flange, an insert slidably engaged in said housing for receiving a disc, said insert including a front portion, a knob pivotally coupled to said front portion of said insert at a pivot shaft and including a latch for engaging with said flange of said housing and for securing said insert in said housing, means for biasing said latch to engage with said flange, and means for biasing said insert outward of said housing, said insert biasing means being provided for biasing said insert outward of said housing when said knob is depressed to disengage said latch from said flange against said latch biasing means.

2. The cassette holder according to claim 1 wherein said insert includes a rib extended downward, said insert biasing means includes a resilient ring engaged around said rib of said insert and said flange for biasing said insert outward of said housing.

3. The cassette holder according to claim 1 wherein said knob includes a slit for engaging with an advertising sheet.

4. The cassette holder according to claim 1 wherein said housing includes a base having a pair of channels and having a stop extended in said channels, and includes a cover having a pair of protrusions slidably engaged in said channels of said base, said protrusions are engaged with said stop for securing said cover to said base.

5. The cassette holder according to claim 4, wherein said protrusions each includes two ends, said ends of said protrusions each includes a tapered surface for allowing said protrusions to be moved over said stop.

6. The cassette holder according to claim 4, wherein said cover of said housing includes a pair of ears provided in said front portion of said housing, said insert includes a rear portion having a pair of guides for engaging with said ears of said cover and for preventing said insert from being disengaged from said cover.

* * * * *